(No Model.)

J. B. ENTZ.
DYNAMO ELECTRIC MACHINERY.

No. 444,486. Patented Jan. 13, 1891.

WITNESSES:

INVENTOR
Justus B. Entz.
BY
ATTORNEY.

UNITED STATES PATENT OFFICE.

JUSTUS B. ENTZ, OF NEW YORK, N. Y.

DYNAMO-ELECTRIC MACHINERY.

SPECIFICATION forming part of Letters Patent No. 444,486, dated January 13, 1891.

Application filed July 10, 1890. Serial No. 358,272. (No model.)

*To all whom it may concern:*

Be it known that I, JUSTUS B. ENTZ, a citizen of the United States, residing in New York city, in the county of New York and State of New York, have invented certain new and useful Improvements in Dynamo-Electric Machinery, of which the following is a specification.

This invention has reference to dynamo-electric machines and motors. It has more special reference to the design of the field-magnets, the object being to provide a machine which will be as compact as possible without loss in efficiency; and to this end the invention consists of a field-magnet embodying a single coil of wire surrounding an iron core, the latter having attached to one of its ends a pole or poles which extend across the head of the coil and along the side thereof until they project beyond the opposite head of the coil and there form working pole-faces on pole-pieces connected with the opposite end of the core.

Figure 3:
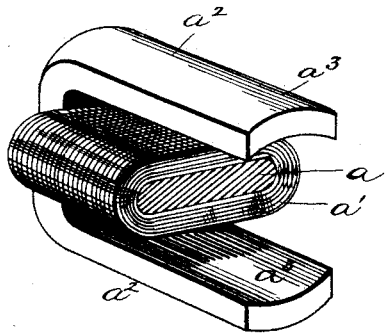
Figure 2:
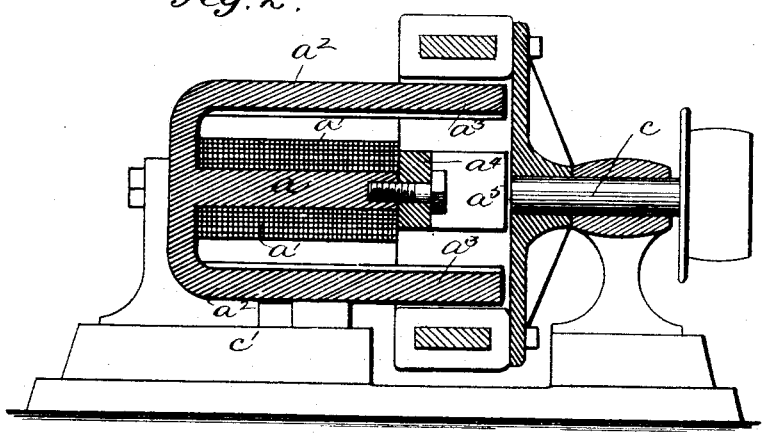
Figure 1:
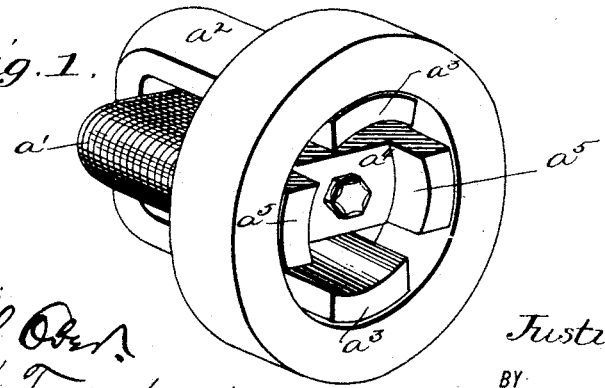

In the accompanying drawings, Figure 1 represents a perspective view of the field-magnet and an armature, the frame being left out. Fig. 2 represents a vertical central section of the machine, showing the supporting-frame; and Fig. 3 represents a perspective view of the field-magnet coil and the pole-pieces attached to one end.

$a$ represents an iron core elliptical in cross-section and surrounded by a single coil of wire $a'$. Attached to or formed integral with one end of the iron core are the pole-pieces $a^2$. These extend across the head or butt of the coil, and thence along the side thereof until they project a short distance past the opposite or front end of the coil and have formed upon them working pole-faces $a^3$. The opposite or front end of the core has attached to it by bolts or otherwise a pole-piece $a^4$, having lateral extensions provided with working pole-faces $a^5$ in the same plane with the pole-faces $a^3$. In the form of machine illustrated there are two pole-pieces connected with each end of the magnet, and their working-faces alternate with each other at ninety degrees apart in a plane immediately in front of one end of the head of the magnet.

Although I have shown and described a four-pole machine, it is quite obvious that any number of poles may be used, from two upward. In a four-pole machine I prefer to make the core elliptical, so that I may utilize the greatest amount of space for the wire.

The armature as here shown is of the ring type and located on the outside of the poles; but it is obvious that the armature may be either a "ring" or a "drum" and located inside of the pole-pieces.

In Fig. 2 the armature is shown mounted on a spider carried by a small shaft $c$, and the field-magnet is supported upon the bolster $c'$.

Having thus described my invention, I claim—

In a dynamo-electric machine or motor, a field-magnet consisting of a single coil of wire wound upon an elliptically-shaped core, and extended pole-pieces passing from one end of the core around the side of the magnet to the other end and alternating around a circle, with pole-pieces connected to said other end.

In witness whereof I have hereunto affixed my seal and signed my name in the presence of two subscribing witnesses.

JUSTUS B. ENTZ. [L. S.]

Witnesses:
 MONTGOMERY WADDELL,
 W. A. PHILLIPS.